United States Patent
Cannella et al.

(10) Patent No.: US 9,169,451 B2
(45) Date of Patent: Oct. 27, 2015

(54) JET FUELS HAVING SUPERIOR THERMAL STABILITY

(75) Inventors: William J. Cannella, Orinda, CA (US); Jaime Lopez, Benicia, CA (US)

(73) Assignee: Chevron U.S.A Inc., San Ramon, CA (US)

( * ) Notice: Subject to any disclaimer, the term of this patent is extended or adjusted under 35 U.S.C. 154(b) by 300 days.

(21) Appl. No.: 13/208,813

(22) Filed: Aug. 12, 2011

(65) Prior Publication Data

US 2012/0211399 A1    Aug. 23, 2012

Related U.S. Application Data

(60) Provisional application No. 61/374,136, filed on Aug. 16, 2010.

(51) Int. Cl.
| | | |
|---|---|---|
| C10L 1/04 | (2006.01) | |
| C10G 45/68 | (2006.01) | |
| C10G 45/70 | (2006.01) | |
| B01J 21/12 | (2006.01) | |
| B01J 23/85 | (2006.01) | |
| B01J 23/883 | (2006.01) | |
| B01J 23/888 | (2006.01) | |
| B01J 29/14 | (2006.01) | |
| B01J 29/16 | (2006.01) | |

(52) U.S. Cl.
CPC . *C10L 1/04* (2013.01); *C10G 45/68* (2013.01); *C10G 45/70* (2013.01); *B01J 21/12* (2013.01); *B01J 23/85* (2013.01); *B01J 23/883* (2013.01); *B01J 23/888* (2013.01); *B01J 29/146* (2013.01); *B01J 29/166* (2013.01); *B01J 2229/42* (2013.01); *C10G 2300/301* (2013.01); *C10G 2400/08* (2013.01)

(58) Field of Classification Search
CPC ..... C10L 1/04; C10L 1/608; C10L 2200/043; C10L 2270/04; C10L 2300/1051; C10L 2300/1096; C10L 2400/08
USPC ...................... 44/300; 208/15; 585/14, 20, 21
See application file for complete search history.

(56) References Cited

U.S. PATENT DOCUMENTS

| | | | | |
|---|---|---|---|---|
| 3,130,007 A | | 4/1964 | Breck et al. | |
| 3,536,605 A | | 10/1970 | Kittrell | |
| 3,620,961 A | * | 11/1971 | Ireland et al. | 208/79 |
| 3,808,326 A | | 4/1974 | McDaniel et al. | |
| 3,835,027 A | | 9/1974 | Ward et al. | |
| 4,162,961 A | | 7/1979 | Marmo | |
| 4,875,992 A | * | 10/1989 | Hamner | 208/89 |
| 4,968,402 A | | 11/1990 | Kirker et al. | |
| 5,219,814 A | | 6/1993 | Kirker et al. | |
| 5,468,262 A | | 11/1995 | Acker et al. | |
| 5,868,921 A | | 2/1999 | Barre et al. | |
| 5,954,941 A | * | 9/1999 | Mercier et al. | 208/15 |
| 6,776,897 B2 | * | 8/2004 | Bacha et al. | 208/14 |
| 6,893,475 B1 | | 5/2005 | Ellis et al. | |
| 7,033,484 B2 | * | 4/2006 | Bacha et al. | 208/14 |
| 7,320,748 B2 | * | 1/2008 | Hemighaus et al. | 208/14 |
| 7,374,657 B2 | * | 5/2008 | Miller et al. | 208/14 |
| 2006/0049080 A1 | | 3/2006 | Bacha | |
| 2006/0111599 A1 | | 5/2006 | Lamprecht | |
| 2006/0138024 A1 | | 6/2006 | Miller | |
| 2007/0187291 A1 | * | 8/2007 | Miller et al. | 208/15 |
| 2008/0256846 A1 | | 10/2008 | Yoshida | |
| 2009/0000185 A1 | * | 1/2009 | Aulich et al. | 44/308 |
| 2009/0100746 A1 | * | 4/2009 | Lopez et al. | 44/300 |
| 2009/0159489 A1 | * | 6/2009 | Lopez et al. | 208/15 |
| 2009/0314683 A1 | * | 12/2009 | Matsushita | 208/111.3 |
| 2010/0025298 A1 | * | 2/2010 | Hommeltoft et al. | 208/135 |
| 2011/0005190 A1 | * | 1/2011 | Bauldreay et al. | 60/39.461 |
| 2011/0061290 A1 | * | 3/2011 | Aulich et al. | 44/308 |
| 2012/0211399 A1 | * | 8/2012 | Cannella et al. | 208/15 |

FOREIGN PATENT DOCUMENTS

| | | |
|---|---|---|
| GB | 882722 A | 11/1961 |
| JP | 2008222779 A | 9/2008 |
| WO | 03035807 A | 5/2003 |
| WO | 2008012320 A1 | 1/2008 |
| WO | 2009014859 A2 | 1/2009 |
| WO | 2009117426 A1 | 9/2009 |
| WO | WO 2010/048251 | 4/2010 |

OTHER PUBLICATIONS

PCT—International Search Report and Written Opinion.
Kinder et al. (Jun. 1, 2009) "Evaluation of Bio-Derived Synthetic Paraffinic Kerosenes (Bio-SPK)", URL:http://www.boeing.com/commericial/environmental/pdf/ PAS_biofuel_Exec_Summary.pdf.
Office Action issued in counterpart Japanese Patent Application No. 2013-524897 dated Jun. 16, 2015.

* cited by examiner

*Primary Examiner* — Ellen McAvoy
(74) *Attorney, Agent, or Firm* — Josetta I. Jones; M. Carmen & Associates, PLLC

(57) ABSTRACT

Disclosed herein are jet fuel compositions containing (a) a total aromatics content of from 2 vol. % to no more than about 25 vol. %; (b) a net heat of combustion of at least about 125,000 Btu/gal; (c) a concentration of less than about 5 vol. % of hydrocarbons having a boiling point greater than or equal to about 550° F., as determined by ASTM D 2887; and (d) a Jet Fuel Thermal Oxidation Test (JFTOT) thermal stability characterized by a filter pressure drop of no more than 25 mm Hg, a breakpoint temperature greater than or equal to about 300° C., and an overall tube deposit rating less than 3, as determined by ASTM D 3241. Methods for their preparation are also disclosed.

19 Claims, No Drawings

JET FUELS HAVING SUPERIOR THERMAL STABILITY

This application claims the benefit of the filing date of the U.S. Provisional Application Ser. No. 61/374,146 filed Aug. 16, 2010.

BACKGROUND OF THE INVENTION

1. Technical Field

The present invention generally relates to a jet fuel having improved thermal-oxidation stability, as determined by ASTM D3241, and methods for preparing same.

2. Description of the Related Art

Distillate fuels which are intended for use in jet turbines must meet certain minimum standards in order to be suitable for use. Jet fuel must have good oxidation stability in order to prevent the formation of unacceptable amounts of deposits which are harmful to the turbine engines in which they are intended to be used. Jet fuel is also used as a heat sink in turbine engines. These deposits will create maintenance problems in the turbine engines.

Currently, fuel thermal stability is recognized as one of the most important properties of jet fuels. ASTM D3241 is the standard analytical procedure for rating fuel thermal stability and a fuel will either pass or fail at a given temperature. Generally, fuels for use in jet turbines will usually have a passing jet fuel thermal-oxidation tester (JFTOT) rating as determined by ASTM D3241 at 260° C.

The thermal stability of jet fuel has been recognized as a problem for many years. High speed flight necessitates that the heat generated be dissipated through the fuel, i.e., the fuel is purposely preheated prior to combustion. As aircraft have become more sophisticated with more electronic components, the heat load has increased and the fuel must be preheated to a higher temperature to absorb the energy. This makes the thermal stability of the fuel even more critical. The chemistry leading to particulate and deposit formation is extremely complex and very difficult to provide thermal stability of jet fuels.

The impact of lowering the aromatic content of distillate fuels used as diesel fuel or jet fuel on seal swell in diesel and jet engines is known. Since the transition from conventional distillate fuels to low aromatic fuels created problems with seal swell, greater seal swell problems associated with the transition to a highly paraffinic distillate fuel component made from, for example, a Fischer Tropsch process, is expected.

Distillates having very high levels of saturates, such as distillates recovered from the Fischer Tropsch process, have been shown to have excellent smoke points, usually in excess of 40 mm, and low sulfur contents. As such, highly paraffinic distillates appear to be useful for blending with lower quality distillates in order to obtain a distillate blend meeting the requirements for jet fuel. What has not been recognized is that some highly paraffinic distillate components, especially those characterized by low to moderate branching of the molecule, such as those products produced by the low temperature Fischer Tropsch process, when blended with conventional distillate components can show poor thermal stability leading to the formation of unacceptable amounts of deposits.

U.S. Pat. No. 4,162,961 discloses a cycle oil that is hydrogenated under conditions such that the product of the hydrogenation process can be fractionated.

U.S. Pat. No. 4,968,402 discloses a one stage process for producing high octane gasoline from a highly aromatic hydrocarbon feedstock.

U.S. Pat. No. 5,219,814 discloses a moderate pressure hydrocracking process in which highly aromatic, substantially dealkylated feedstock is processed to high octane gasoline and low sulfur distillate by hydrocracking over a catalyst, preferably comprising ultrastable Y and Group VIII metal and a Group VI metal, in which the amount of the Group VIII metal content is incorporated at specified proportion into the framework aluminum content of the ultrastable Y component.

U.S. Pat. No. 5,468,262 discloses the use of phenol-aldehyde-polyamine Mannich condensate with a succinic acid anhydride bearing a polyolefin to improve the thermal stability of jet fuel at 260° C.

U.S. Pat. No. 5,868,921 discloses a hydrocarbon distillate fraction that is hydrotreated in a single stage by passing the distillate fraction downwardly over a stacked bed of two hydrotreating catalysts.

U.S. Pat. No. 6,893,475 disclose a distillate fuel having a sulfur level of less than about 100 wppm, a total aromatics content of about 15 to 35 wt. %, a polynuclear aromatics content of less than about 3 wt. %, wherein the ratio of total aromatics to polynuclear aromatics is greater than about 11.

Accordingly, it would be desirable to provide a jet fuel composition having improved thermal-oxidation stability, as determined by ASTM D3241, as well as acceptable seal swell properties.

SUMMARY OF THE INVENTION

In accordance with one embodiment of the present invention, there is provided a jet fuel composition comprising:
- (a) a total aromatics content of from 2 vol. % to no more than about 25 vol. %;
- (b) a net heat of combustion of at least about 125,000 Btu/gal;
- (c) a concentration of less than about 5 vol. % of hydrocarbons having a boiling point greater than or equal to about 550° F., as determined by ASTM D 2887; and
- (d) a Jet Fuel Thermal Oxidation Test (JFTOT) thermal stability characterized by a filter pressure drop of no more than 25 mm Hg, a breakpoint temperature greater than or equal to about 300° C., and an overall tube deposit rating less than 3, as determined by ASTM D 3241.

In accordance with a second embodiment of the present invention, there is provided a jet fuel composition comprising:
- (a) a total aromatics content of from 2 vol. % to no more than about 25 vol. %;
- (b) a net heat of combustion of at least about 125,000 Btu/gal;
- (c) a concentration of less than about 3 vol. % of hydrocarbons having a boiling point greater than or equal to about 550° F., as determined by ASTM D 2887;
- (d) a JFTOT thermal stability characterized by a filter pressure drop of no more than 25 mm Hg, a breakpoint temperature greater than or equal to about 300° C., and an overall tube deposit rating less than 3, as determined by ASTM D 3241; and
- (e) a total paraffin content of at least about 64 vol. %.

In accordance with a third embodiment of the present invention, there is provided a method of making a jet fuel composition, which comprises:
- (a) providing a hydrocarbonaceous feedstock comprising at least about 40 vol % total aromatics; and (b) subjecting at least a portion of the hydrocarbonaceous feedstock to hydrogenation under catalytic hydrogenating conditions to form a jet fuel composition comprising:
  (i) a total aromatics content of from 2 vol. % to no more than about 25 vol. %;
  (ii) a net heat of combustion of at least about 125,000 Btu/gal;
  (iii) a concentration of less than about 5 vol. % of hydrocarbons having a boiling point greater than or equal to about 550° F., as determined by ASTM D 2887; and
  (iv) a JFTOT thermal stability characterized by a filter pressure drop of no more than 25 mm Hg, a breakpoint temperature greater than or equal to about 300° C., and an overall tube deposit rating less than 3, as determined by ASTM D 3241.

In accordance with a fourth embodiment of the present invention, there is provided a method of making a jet fuel composition, which comprises:
  (a) providing a hydrocarbonaceous feedstock comprising at least about 40 vol % total aromatics;
  (b) subjecting at least a portion of the hydrocarbonaceous feedstock to hydrogenation under catalytic hydrogenating conditions to form a hydrogenated hydrocarbonaceous feedstock; and
  (c) separating from the hydrogenated hydrocarbonaceous feedstock any hydrocarbons having a boiling point greater than or equal to about 550° F., as determined by ASTM D 2887, by distillation to form a jet fuel composition comprising:
    (i) a total aromatics content of from 2 vol. % to no more than about 25 vol. %;
    (ii) a net heat of combustion of at least about 125,000 Btu/gal;
    (iii) a concentration of less than about 5 vol. % of hydrocarbons having a boiling point greater than or equal to about 550° F., as determined by ASTM D 2887; and
    (iv) a JFTOT thermal stability characterized by a filter pressure drop of no more than 25 mm Hg, a breakpoint temperature greater than or equal to about 300° C., and an overall tube deposit rating less than 3, as determined by ASTM D 3241.

In accordance with a fifth embodiment of the present invention, there is provided a method of making a jet fuel composition, which comprises:
  (a) providing a hydrocarbonaceous feedstock comprising:
    (i) a total aromatics content of from 2 vol. % to no more than about 25 vol. %; and
    (ii) a cycloparaffin content of at least about 60 vol. %;
  (b) blending a sufficient amount of iso-paraffins and normal paraffins to reduce the cycloparaffin content to about 22 to about 35 vol. %; and
  (c) separating from the blended hydrocarbonaceous feedstock any hydrocarbons having a boiling point greater than or equal to about 550° F., as determined by ASTM D 2887, by distillation to form a jet fuel composition comprising:
    (i) a total aromatics content of from 2 vol. % to no more than about 25 vol. %;
    (ii) a net heat of combustion of at least about 125,000 Btu/gal;
    (iii) a concentration of less than about 5 vol. % of hydrocarbons having a boiling point greater than or equal to about 550° F., as determined by ASTM D 2887;
    (iv) a JFTOT thermal stability characterized by a filter pressure drop of no more than 25 mm Hg, a breakpoint temperature greater than or equal to about 300° C., and an overall tube deposit rating less than 3, as determined by ASTM D 3241; and
    (v) a cycloparaffin content of from about 22 to about 35 vol. %.

The jet fuel compositions of the present invention advantageously possess improved thermal-oxidation stability, as determined by ASTM D3241. The high thermal oxidation stability of the jet fuel compositions of the present invention is a very desirable feature in, for example, jet turbine fuel, and provides an additional margin of safety characterized by minimal deposit formation at operational conditions. In addition, it is believed that by controlling the total aromatic content of the jet fuel compositions to a range of 2 vol. % to no more than about 25 vol. %, acceptable seal swell properties may be achieved. Further, Furthermore, by constraining the amount of hydrocarbons having a boiling point greater than or equal to about 550° F. in the composition to less than 5 vol. % or less than 3 vol. %, it is believed that the freeze point of the composition can also be improved.

DETAILED DESCRIPTION OF THE PREFERRED EMBODIMENTS

The present invention is directed to a jet fuel composition comprising (a) a total aromatics content of from 2 vol. % to no more than about 25 vol. %; (b) a net heat of combustion of at least about 125,000 Btu/gal; (c) a concentration of less than about 5 vol. % of hydrocarbons having a boiling point greater than or equal to about 550° F., as determined by ASTM D 2887; and (d) a Jet Fuel Thermal Oxidation Test (JFTOT) thermal stability characterized by a filter pressure drop of no more than 25 mm Hg, a breakpoint temperature greater than or equal to about 300° C., and an overall tube deposit rating less than 3, as determined by ASTM D 3241.

In one embodiment, a jet fuel composition of the present invention comprises (a) a total aromatics content of from 2 vol. % to no more than about 25 vol. % or from 2 vol. % to no more than about 5 vol. %; (b) a net heat of combustion of at least about 125,000 Btu/gal or at least about 128,000 Btu/gal; (c) a concentration of less than about 5 vol. % or less than about 3 vol. % or less than about 1.5 vol. % or less than about 1 vol. % or zero vol. % of hydrocarbons having a boiling point greater than or equal to about 550° F., as determined by ASTM D 2887; and (d) a JFTOT thermal stability characterized by a filter pressure drop of no more than 25 mm Hg, a breakpoint temperature greater than or equal to about 300° C. or greater than or equal to about 330° C. or greater than or equal to about 360° C., and an overall tube deposit rating less than 3, as determined by ASTM D 3241. In one embodiment, the jet fuel composition of the present invention will have a net heat of combustion of at least about 125,000 Btu/gal or at least about 128,000 Btu/gal and no higher than 130,000 Btu/gal. Any of the combinations of (a)-(d) of the compositions of the present invention are contemplated herein.

In one embodiment, a jet fuel composition of the present invention comprises (a) a total aromatics content of from 2 vol. % to no more than about 25 vol. %; (b) a net heat of combustion of at least about 125,000 Btu/gal; (c) a total paraffin content of at least about 64 vol. % or at least about 75 vol. %; (d) a concentration of less than about 5 vol. % of hydrocarbons having a boiling point greater than or equal to about 550° F., as determined by ASTM D 2887; and (e) a JFTOT thermal stability characterized by a filter pressure drop of no more than 25 mm Hg, a breakpoint temperature greater than or equal to about 300° C., and an overall tube deposit rating less than 3, as determined by ASTM D 3241.

In one embodiment, a jet fuel composition of the present invention comprises (a) a total aromatics content of from 2 vol. % to no more than about 25 vol. % or from 2 vol. % to no more than about 5 vol. %; (b) a net heat of combustion of at least about 125,000 Btu/gal; (c) a cycloparaffin content of from about 22 vol. % to about 35 vol. %, based on the total weight of the total paraffin content; (d) a normal paraffin content of from about 20 vol. % to about 35 vol. %, based on the total weight of the total paraffin content; (e) an iso-paraffin content of from about 22 vol. % to about 35 vol. %, based on the total weight of the total paraffin content; (f) a concentration of less than about 3 vol. % or less than about 1.5 vol. % or less than about 1 vol. % or zero vol. % of hydrocarbons having a boiling point greater than or equal to about 550° F., as determined by ASTM D 2887; and (g) a JFTOT thermal stability characterized by a filter pressure drop of no more than 25 mm Hg, a breakpoint temperature above about 300° C., and an overall tube deposit rating less than 3, as determined by ASTM D 3241.

In one embodiment, the aromatic content of the jet fuel compositions of the present invention according to the foregoing embodiments will contain a mono-aromatic content which is greater than the polycyclic aromatic content. While the inventors do not wish to be bound by any one theory, it is believed that polycyclic aromatic compounds present in the compositions contribute to thermal instability and deposit formation.

In one embodiment, the smoke point of the jet fuel compositions of the present invention according to the foregoing embodiments will be at least above about 19 mm, as determined by ASTM D 1322.

In one embodiment, the freeze point of the jet fuel compositions of the present invention according to the foregoing embodiments will be no higher than about −41° C., as determined by ASTM D 2386.

In one embodiment, a jet fuel composition of the present invention can be obtained by (a) providing a hydrocarbonaceous feedstock comprising at least about 40 vol % total aromatics; (b) subjecting at least a portion of the hydrocarbonaceous feedstock to hydrogenation under catalytic hydrogenating conditions to form a hydrogenated hydrocarbonaceous feedstock having a total aromatics content of from 2 vol. % to no more than about 25 vol. %; and, optionally, (c) separating from the hydrogenated hydrocarbonaceous feedstock a substantial portion, or all, of any hydrocarbons having a boiling point greater than or equal to about 550° F., as determined by ASTM D 2887, by distillation to form the jet fuel composition.

Generally, a hydrocarbonaceous feedstock comprising at least about 40 vol. % total aromatics can be derived from any source wherefrom such a hydrocarbonaceous feedstock may be obtained, produced, or the like. In one embodiment, the source may be any convention jet fuel comprising at least about 80 vol. % total aromatics. In one embodiment, the source may be one or more producing wells in fluid communication with a subterranean oil reservoir. The producing well(s) may be under thermal recovery conditions, or the producing well(s) may be in a heavy oil field where the hydrocarbon crude or oil is being produced from a reservoir having a strong water-drive. Thus, in some instances, the hydrocarbonaceous feedstock may be hydrotreated prior to being subjected to hydrogenation.

In one embodiment, a hydrocarbonaceous feedstock comprising at least about 40 vol. % total aromatics can be derived from highly aromatic refinery streams such as fluid catalytic cracking cycle oils, e.g., FCC Light Cycle Oil ("LCO"), Medium Cycle Oil ("MCO"), and Heavy Cycle Oil ("HCO"), thermally cracked distillates, and straight run distillates, which come from the crude unit. These feedstocks generally have a boiling-range above about 200° F. and generally have a boiling range between about 350° F. and about 750° F.

At least a portion of the hydrocarbonaceous feedstock is subjected to hydrogenation under catalytic hydrogenating conditions in a reaction zone to form a hydrogenated hydrocarbonaceous feedstock having a total aromatics content of from 2 vol. % to no more than about 25 vol. %. Generally, the hydrocarbonaceous feedstock is contacted with a hydrogenation catalyst in the presence of hydrogen-containing gas in a reaction zone and under effective catalytic hydrogenating conditions to form a second feedstock with a reduced total aromatics content. Effective hydrogenation conditions are to be considered those conditions under which at least a portion of the total aromatics present in the hydrocarbonaceous feedstock are saturated, e.g., at least about 75 vol. % of the total aromatics are saturated, and greater than about 95 wt. % in another embodiment.

Suitable hydrogenation catalysts used herein can be any commercially available hydrogenation catalyst known to one skilled in the art. The term "hydrogenation catalysts" as used herein shall be understood to also include "Hydrocracking catalysts", "Mild hydrocracking catalysts", ""hydrotreating catalysts", "hydrotreating/hydrogenation/saturation catalysts", and "hydrorefining catalysts". As one skilled in the art will readily understand, the particular type of catalyst(s) employed will depend on the selected hydrocarbonaceous feedstock. The reaction zone may contain only one catalyst, or several catalysts in combination.

In one embodiment, suitable hydrogenation catalysts for use herein can be based on a catalyst support such as, for example, an alumina catalyst support, silica-alumina catalyst support, silica catalyst support, titania catalyst support, magnesia catalyst support, and the like. The catalytic metals on the surface of, for example, alumina, include metals, oxides and sulfides of metals of Groups VI-B, VII and VIII of the Periodic Chart of the Elements. Representative of such components include molybdenum, tungsten, manganese, rhenium, cobalt, nickel, platinum, palladium and the like and combinations thereof.

It may also be advantageous to include catalytic promoters in the catalyst employed herein. Catalytic promoters present in the catalyst include, but are not limited to, phosphorus, halogens, silica, zeolites, alkali and alkaline earth metal oxides, combinations thereof and the like that are known to those knowledgeable in the art.

The particle size or shape of the hydrogenation catalyst required for the method of the present invention is generally dictated by the reactor system utilized for practicing the invention. For example, in a visbreaker-like process employing a tubular reactor, finely ground catalyst may be preferred. In an ebullated bed process, the catalyst in the form of extrudates, pellets, or spheres may be advantageously utilized.

Various types of reactors known to one skilled in the art can be used to accomplish the hydrogenation of the hydrocarbonaceous feedstock. For example, one suitable type of reactor is a fluidized bed reactor wherein, for example, a slurry of the hydrocarbonaceous feedstock containing the hydrogenation catalyst is reacted in a fluidized bed reactor in the presence of hydrogen. Another suitable reactor system is an ebullated bed reactor wherein spent hydrogenation catalyst is continuously removed and fresh or regenerated hydrogenation catalyst is continuously added. Another suitable reactor for use herein is a simple hydrovisbreaker-like entrained-bed process in which the hydrogenation catalyst is premixed with the hydrocarbonaceous feedstock to form a slurry, and the slurry along with added hydrogen is then fed through a heated tubular reactor. The reaction system can operate as a single stage reaction process under essentially the same pressure and recycle gas flowrate or as a multistage reaction process.

In one embodiment, effective hydrogenation conditions include a temperature ranging from about 316° C. to about 413° C., a pressure ranging from about 1000 to about 3500 pounds per square inch absolute (psia), a space velocity ranging from about 0.5 to about 3.0 liquid hourly space velocity (LHSV), and a gas flow ranging from about 3500 to about 10,000 Standard cubic feet per barrel (SCFB) of hydrogen of at least about 75% purity. In another embodiment, effective hydrogenation conditions include a temperature ranging from about 360° C. to about 399° C., a pressure ranging from about 1500 to about 2850 psia, a space velocity ranging from about 1.0 to about 2.0 LHSV, and a gas flow ranging from about 5000 to about 8000 SCFB of hydrogen of at least about 80% purity. Alternatively, other gases such as ammonia, (nitrogen), natural gas and fuel gas may also be used along with hydrogen.

Depending on the particular starting hydrocarbonaceous feedstock employed, it may be necessary to subject the hydrogenated hydrocarbonaceous feedstock to one or more distillation steps to separate from the hydrogenated hydrocarbonaceous feedstock any hydrocarbons, if present, having a boiling point greater than or equal to about 550° F. to form a jet fuel composition of the present invention. In one embodiment, the resulting jet fuel composition will have a concentration of less than about 5 vol. % of hydrocarbons having a boiling point greater than or equal to about 550° F., as determined by ASTM D 2887. In another embodiment, the resulting jet fuel composition will have a concentration of less than about 3 vol. % of hydrocarbons having a boiling point greater than or equal to about 550° F., as determined by ASTM D 2887. In another embodiment, the resulting jet fuel composition will have a concentration of less than about 1.5 vol. % of hydrocarbons having a boiling point greater than or equal to about 550° F., as determined by ASTM D 2887. In another embodiment, the resulting jet fuel composition will have a concentration of less than about 1 vol. % of hydrocarbons having a boiling point greater than or equal to about 550° F., as determined by ASTM D 2887. In yet another embodiment, the resulting jet fuel composition will have zero concentration of hydrocarbons having a boiling point greater than or equal to about 550° F., as determined by ASTM D 2887. Distillation can be carried out using any convention distillation equipment.

After the reaction has taken place, the reaction product may be fed to an additional separation unit (i.e., distillation column and the like) in order to separate the high energy density jet, the high energy density diesel, naptha and other products. Any un-reacted product may be recycled to the reaction system for further processing to maximize jet or diesel production.

In another embodiment, a jet fuel composition of the present invention can be obtained by (a) providing a hydrocarbonaceous feedstock comprising: (i) a total aromatics content of from 2 vol. % to no more than about 25 vol. %; and (ii) a cycloparaffin content of at least about 60 vol. %; (b) blending a sufficient amount of iso-paraffins and normal paraffins to reduce the cycloparaffin content to about 22 to about 35 vol. %; and (c) separating from the blended hydrocarbonaceous feedstock any hydrocarbons having a boiling point greater than or equal to about 550° F., as determined by ASTM D 2887, by distillation to form a jet fuel composition comprising:

(i) a total aromatics content of from 2 vol. % to no more than about 25 vol. %;
(ii) a net heat of combustion of at least about 125,000 Btu/gal;
(iii) a concentration of less than about 5 vol. % of hydrocarbons having a boiling point greater than or equal to about 550° F., as determined by ASTM D 2887;
(iv) a JFTOT thermal stability characterized by a filter pressure drop of no more than 25 mm Hg, a breakpoint temperature greater than or equal to about 300° C., and an overall tube deposit rating less than 3, as determined by ASTM D 3241; and
(v) a cycloparaffin content of from about 22 to about 35 vol. %.

A hydrocarbonaceous feedstock comprising: (i) a total aromatics content of from 2 vol. % to no more than about 25 vol. %; and (ii) a cycloparaffin content of at least about 60 vol. % can be obtained by methods known in the art. For example, the hydrocarbonaceous feedstock can be obtained by hydroprocessing a feedstream comprising at least 50 vol % of, for example, a FCC cycle oil to produce a feedstream having a total aromatics content of from 2 to about 25 vol. %; and a cycloparaffin content greater than about 60 vol. %. Generally, this method involves contacting a highly aromatic hydrocarbonaceous feed, as described herein, with a catalyst system of a hydrotreating catalyst and a hydrocracking catalyst under hydroprocessing conditions.

In one embodiment, a hydrocarbon feed is fed to a hydrotreater reactor for sulfur/nitrogen removal and then directly to a hydrogenation/hydrocracking reactor. The hydrogenated/hydrocracked product is fed to the high pressure separator where the reactor effluent is separated into a gas and liquid stream. The product gas is recompressed by the recycle gas compressor to yield stream which is then recycled into the reactor inlet where it is combined with the makeup hydrogen and hydrocarbon gas oil feed. The liquid stream is depressured at the liquid level control valve and the product is separated into a gas stream and into a liquid stream in the low pressure separator. The product stream is then fed to a distillation system where the product is separated to yield a gas stream, a naphtha product, and a high volumetric energy fuel and diesel. Optionally, a portion of the diesel stream can be recycled to the second stage reactor to balance the jet/diesel product slate.

The hydrocarbon feedstock can be selected from FCC effluent, including an FCC light cycle oil, fractions of jet fuels, a coker product, coal liquefied oil, the product oil from the heavy oil thermal cracking process, the product oil from heavy oil hydrocracking, straight run cut from a crude unit, and mixtures thereof, and having a major portion of the feedstock having a boiling range of from about 250° F. to about 800° F., and preferably from about 350° F. to about 600° F. The term "major portion" as used in this specification shall mean at least 50 wt. %. Typically, the feedstock is highly aromatic and has up to, for example, about 80 wt. % aromatics, up to about 3 wt. % sulfur and up to about 1 wt. % nitrogen. In one embodiment, the feedstock has an aromatic carbon content of at least about 40 wt. % aromatics. Typically, the cetane number is about 25 units.

The catalyst system employed in this method comprises at least two catalyst layers including a hydrotreating catalyst and a hydrogenation/hydrocracking catalyst. Optionally, the catalyst system may also comprise at least one layer of a demetallization catalyst and at least one layer of a second hydrotreating catalyst. The hydrotreating catalysts contains a hydrogenation component such as a metal from Group VIB and a metal from Group VIII, their oxides, their sulfide, and mixtures thereof and may contain an acidic component such as fluorine, small amounts of crystalline zeolite or amorphous silica alumina.

The hydrocracking catalysts contains a hydrogenation component such as a metal from Group VIB and a metal from Group VIII, their oxides, their sulfide, and mixtures thereof and contains an acidic component such as a crystalline zeolite or amorphous silica alumina.

One of the zeolites which is considered to be a good starting material for the manufacture of hydrocracking catalysts is the well-known synthetic zeolite Y as described in U.S. Pat. No. 3,130,007. A number of modifications to this material have been reported one of which is ultrastable Y zeolite as described in U.S. Pat. No. 3,536,605. To further enhance the utility of synthetic Y zeolite, additional components can be added. For example, U.S. Pat. No. 3,835,027 discloses a hydrocracking catalysts containing at least one amorphous refractory oxide, a crystalline zeolitic aluminosilicate and a hydrogenation component selected from the Group VI and Group VIII metals and their sulfides and their oxides.

A hydrocracking catalyst which is a comulled zeolitic catalyst comprising about 17 weight percent alumina binder, about 12 weight percent molybdenum, about 4 weight percent nickel, about 30 weight percent Y-zeolite, and about 30 weight percent amorphous silica/alumina can also be used. This more general hydrocracking catalyst comprises a Y zeolite having a unit cell size greater than about 24.55 Angstroms and a crystal size less than about 2.8 microns together with an amorphous cracking component, a binder, and at least one hydrogenation component selected from the group consisting of a Group VI metal and/or Group VIII metal and mixtures thereof. In preparing a Y zeolite for use in the method of this embodiment, the process disclosed in U.S. Pat. No. 3,808,326 can be followed to produce a Y zeolite having a crystal size less than about 2.8 microns.

More specifically, the hydrocracking catalyst suitably comprises from about 30% to about 90% by weight of Y zeolite and amorphous cracking component, and from about 70% to about 10% by weight of binder. In one embodiment, the catalyst comprises relatively high amounts of Y zeolite and amorphous cracking component, that is, from about 60% to about 90% by weight of Y zeolite and amorphous cracking component, and from about 40% to about 10% by weight of binder. In another embodiment, the catalyst comprises about 80% to about 85% by weight of Y zeolite and amorphous cracking component, and from about 20% to about 15% by weight of binder. In one embodiment, silica-alumina is used as the amorphous cracking component.

The amount of Y zeolite in the catalyst can range from about 5 to about 70% by weight of the combined amount of zeolite and cracking component. In another embodiment, the amount of Y zeolite in the catalyst compositions ranges from about 10% to about 60% by weight of the combined amount of zeolite and cracking component. In another embodiment, the amount of Y zeolite in the catalyst compositions can range from about 15 to about 40% by weight of the combined amount of zeolite and cracking component.

Depending on the desired unit cell size, the $SiO_2/A_2O_3$ molar ratio of the Y zeolite may have to be adjusted. There are many techniques described in the art which can be applied to adjust the unit cell size accordingly. It has been found that Y zeolites having a $SiO_2/A_2O_3$ molar ratio of from about 3 to about 30 can be suitably applied as the zeolite component of the catalyst compositions according to the present invention. Preference is given to Y zeolites having a molar $SiO_2/A_2O_3$ ratio from about 4 to about 12, and most preferably having a molar $SiO_2/A_2O_3$ ratio from about 5 to about 8.

The amount of cracking component such as silica-alumina in the hydrocracking catalyst ranges from about 10% to 50% by weight, preferably from about 25% to about 35% by weight. The amount of silica in the silica-alumina ranges from about 10% to about 70% by weight. In one embodiment, the amount of silica in the silica-alumina can range from about 20% to about 60% by weight. In another embodiment, the amount of silica in the silica-alumina can range from about 25% to about 50% by weight. Also, so-called X-ray amorphous zeolites (i.e., zeolites having crystallite sizes too small to be detected by standard X-ray techniques) can be suitably applied as cracking components according to the process embodiment of the present invention. The catalyst may also contain fluorine at a level of from about 0.0 wt % to about 2.0 wt %.

The binder(s) present in the hydrocracking catalyst suitably comprise inorganic oxides. Both amorphous and crystalline binders can be applied. Examples of suitable binders comprise silica, alumina, clays and zirconia. Preference is given to the use of alumina as binder.

The amount(s) of hydrogenation component(s) in the catalyst suitably range from about 0.5% to about 30% by weight of Group VIII metal component(s) and from about 0.5% to about 30% by weight of Group VI metal component(s), calculated as metal(s) per 100 parts by weight of total catalyst. The hydrogenation components in the catalyst may be in the oxidic and/or the sulphidic form. If a combination of at least a Group VI and a Group VIII metal component is present as (mixed) oxides, it will be subjected to a sulphiding treatment prior to proper use in hydrocracking.

Suitably, the catalyst comprises one or more components of nickel and/or cobalt and one or more components of molybdenum and/or tungsten or one or more components of platinum and/or palladium. The hydrotreating catalyst comprises from about 2% to about 20% by weight of nickel and from about 5% to about 20% by weight molybdenum, calculated as metals per 100 parts by weight of total catalyst. In one embodiment, the catalyst comprises 3% to about 10% nickel and from about 5% to about 20 molybdenum, calculated as metals per 100 parts by weight of total catalyst. In another embodiment, the catalyst comprises from about 5% to about 10% by weight of nickel and from about 10% to about 15% by weight molybdenum, calculated as metals per 100 parts by weight of total catalyst. In another embodiment, the catalyst comprises from about 5% to about 8% nickel and from about 8% to about 15% nickel. The total weight percent of metals employed in the hydrotreating catalyst is at least about 15 wt. %. In one embodiment, the ratio of the nickel catalyst to the molybdenum catalyst is no greater than about 1:1.

The active metals in the hydrogenation/hydrocracking catalyst comprise nickel and at least one or more VI B metal. In one embodiment, the hydrogenation/hydrocracking catalyst comprises nickel and tungsten or nickel and molybdenum. Typically, the active metals in the hydrogenation/hydrocracking catalyst comprise from about 3% to about 30% by weight of nickel and from about 2% to about 30% by weight tungsten, calculated as metals per 100 parts by weight of total catalyst. In one embodiment, the active metals in the hydrogenation/hydrocracking catalyst comprise from about 5% to about 20% by weight of nickel and from about 5% to about 20% by weight tungsten. In one embodiment, the active metals in the hydrogenation/hydrocracking catalyst comprise from about 7% to about 15% by weight of nickel and from about 8% to about 15% by weight tungsten. In one embodiment, the active metals in the hydrogenation/hydrocracking catalyst comprise from about 9% to about 15% by weight of nickel and from about 8% to about 13% by weight tungsten. The total weight percent of the metals is from about 25 wt. % to about 40 wt. %.

Optionally, the acidity of the hydrogenation/hydrocracking catalyst may be enhanced by adding at least 1 wt. % fluoride, and generally from about 1 to about 2 wt. % fluoride.

In another embodiment, the hydrogenation/hydrocracking catalyst may be replaced by a similarly high activity base metal catalyst where the support is an amorphous alumina or silica or both and where the acidity has been enhanced by a zeolite, such as H-Y in a concentration of from about 0.5 wt. % to about 15 wt. %.

The effective diameter of the hydrotreating catalyst particles was about 0.1 inch, and the effective diameter of the hydrocracking catalyst particles was also about 0.1 inch. The two catalysts are intermixed in a weight ratio of about 1.5:1 hydrotreating to hydrocracking catalyst.

Optionally, a demetallization catalyst may be employed in the catalyst system. Typically, the demetallization catalyst comprises Group VIB and Group VIII metals on a large pore alumina support. The metals may comprise nickel, molybdenum and the like on a large pore alumina support. In one embodiment, at least about 2 wt. % nickel is employed and at least about 6 wt. % molybdenum is employed. The demetallization catalyst may be promoted with at least about 1 wt. % phosphorous.

Optionally, a second hydrotreating catalyst may also be employed in the catalyst system. The second hydrotreating catalyst comprises the same hydrotreating catalyst as described herein.

The reaction system operates as a single stage reaction process under essentially the same pressure and recycle gas flowrate. The reaction system has two sections: a hydrotreating section and a hydrocracking section, which are located in series. There is a pressure differential between the hydrotreating section and the hydrocracking section caused by pressure drop due to flow through the catalyst. The pressure differential is no more than about 200 psi. In one embodiment, the pressure differential is no more than about 100 psi. In one embodiment, the pressure differential is no more than about 50 psi.

In general, hydrocarbonaceous feedstock is contacted with hydrogen in the presence of the catalyst system under upgrading conditions which generally include a temperature in the range of from about 550° F. to about 775° F., preferably from about 650° F. to about 750° F., and most preferred from about 700° F. to about 725° F.; a pressure of from about 750 psia to about 3,500 psia, preferably from about 1,000 psia to about 2,500 psia, and most preferred from about 1250 psia to about 2000 psia; and a LHSV of from about 0.2 to about 5.0, preferably from about 0.5 to about 2.0, and most preferred from about 0.8 to about 1.5; and an oil to gas ratio of from about 1,000 standard cubic feet per barrel (scf/bbl) to about 15,000 scf/bbl, preferably from about 4,000 scf/bbl to about 12,000 scf/bbl, and most preferred from about 6,000 scf/bbl to about 10,000 scf/bbl.

The catalyst system of the present invention can be used in a variety of configurations. In the present invention, however, the catalyst is used in a single stage reaction system. Preferably, a reaction system contains a hydrotreater and a hydrocracker reactor operating in the same recycle gas loop and at essentially the same pressure. For example, the highly aromatic feed is introduced to the high pressure reaction system, which contains the hydrotreating and hydrocracking catalysts. The feed is combined with recycled hydrogen and introduced to the reaction system which comprises a first section containing a hydrotreating catalyst and a second section containing a hydrocracking catalyst. The first section comprises at least one reaction bed containing a hydrotreating catalyst. The second section comprises at least one reaction bed containing a hydrocracking catalyst. Both sections are operating at the same pressure. Under reaction conditions, the highly aromatic feed is saturated to extremely high levels therein producing a highly saturated product. The effluent from the reaction system is a highly saturated product having a boiling range in the jet and diesel ranges. After the reaction has taken place, the reaction product is fed to a separation unit (i.e., distillation column and the like) in order to separate the high energy density jet, the high energy density diesel, naptha and other products. Un-reacted product may be recycled to the reaction system for further processing to maximize jet or diesel production.

Next, the hydrocarbonaceous feedstock comprising (i) a total aromatics content of from 2 vol. % to no more than about 25 vol. %; and (ii) a cycloparaffin content of at least about 60 vol. % will be blended with a sufficient amount of iso-paraffins and normal paraffins to reduce the cycloparaffin content to about 22 to about 35 vol. %. Generally, a sufficient amount of iso-paraffins and normal paraffins can be determined by one skilled in the art depending on the cycloparaffin content in the feedstock. It is particularly advantageous to blend the iso-paraffins and normal paraffins with the feedstock such that the blended feedstock contains an iso-paraffin content to about 22 to about 35 vol. % and normal paraffin content to about 20 to about 35 vol. %.

Next, the blended hydrocarbonaceous feedstock will be subjected to one or more distillation steps to separate from the feedstock any hydrocarbons having a boiling point greater than or equal to about 550° F., as determined by ASTM D 2887. The distillation can be carried out as discussed hereinabove. The resulting jet fuel composition will comprise the characteristics discussed hereinabove, e.g., (i) a total aromatics content of from 2 vol. % to no more than about 25 vol. %;
(ii) a net heat of combustion of at least about 125,000 Btu/gal;
(iii) a concentration of less than about 5 vol. % of hydrocarbons having a boiling point greater than or equal to about 550° F., as determined by ASTM D 2887;
(iv) a JFTOT thermal stability characterized by a filter pressure drop of no more than 25 mm Hg, a breakpoint temperature greater than or equal to about 300° C., and an overall tube deposit rating less than 3, as determined by ASTM D 3241;
(v) a cycloparaffin content of from about 22 to about 35 vol. %;
(vi) normal paraffin content to about 20 to about 35 vol. %; and
(vii) an iso-paraffin content to about 22 to about 35 vol. %.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A jet fuel composition comprising:
(a) a total aromatics content of from 2 vol. % to no more than about 25 vol. %;

(b) a net heat of combustion of at least about 128,000 Btu/gal;
(c) a concentration of less than about 5 vol. % of hydrocarbons having a boiling point greater than or equal to about 550° F., as determined by ASTM D 2887;
(d) a Jet Fuel Thermal Oxidation Test (JFTOT) thermal stability characterized by a filter pressure drop of no more than 25 mm Hg, a breakpoint temperature greater than or equal to about 300° C., and an overall tube deposit rating less than 3, as determined by ASTM D 3241;
(e) a cycloparaffin content of from about 22 vol. % to about 35 vol. %, based on the total weight of the total paraffin content;
(f) a normal paraffin content of from about 20 vol. % to about 35 vol. %, based on the total weight of the total paraffin content; and
(g) an iso-paraffin content of from about 22 vol. % to about 35 vol. %, based on the total weight of the total paraffin content,
wherein jet fuel composition is derived from a hydrocarbonaceous feedstock selected from the group consisting of one or more producing wells in fluid communication with a subterranean oil reservoir and a highly aromatic refinery stream.

2. The jet fuel composition of claim 1, further comprising: a total paraffin content of at least about 75 vol. %.

3. The jet fuel composition of claim 1, wherein the total aromatics content is from 2 vol. % to no more than about 5 vol. %.

4. The jet fuel composition of claim 1, wherein the total aromatics content includes a mono-aromatic content which is greater than the polycyclic aromatic content.

5. The jet fuel composition of claim 1, comprising:
(a) a total aromatics content of from 2 vol. % to no more than about 5 vol. %;
(b) a net heat of combustion of at least about 128,000 Btu/gal;
(c) a concentration of less than about 3 vol. % of hydrocarbons having a boiling point greater than or equal to about 550° F., as determined by ASTM D 2887; and
(d) a JFTOT thermal stability characterized by a filter pressure drop of no more than 25 mm Hg, a breakpoint temperature greater than or equal to about 330° C., and an overall tube deposit rating less than 3, as determined by ASTM D 3241;
(e) a cycloparaffin content of from about 22 vol. % to about 35 vol. %, based on the total weight of the total paraffin content;
(f) a normal paraffin content of from about 20 vol. % to about 35 vol. %, based on the total weight of the total paraffin content; and
(g) an iso-paraffin content of from about 22 vol. % to about 35 vol. %, based on the total weight of the total paraffin content.

6. The jet fuel composition of claim 1, comprising:
(a) a total aromatics content of from 2 vol. % to no more than about 5 vol. %;
(b) a net heat of combustion of at least about 128,000 Btu/gal;
(c) a concentration of less than about 1.5 vol. % of hydrocarbons having a boiling point greater than or equal to about 550° F., as determined by ASTM D 2887; and
(d) a JFTOT thermal stability characterized by a filter pressure drop of no more than 25 mm Hg, a breakpoint temperature greater than or equal to about 360° C., and an overall tube deposit rating less than 3, as determined by ASTM D 3241;
(e) a cycloparaffin content of from about 22 vol. % to about 35 vol. %, based on the total weight of the total paraffin content;
(f) a normal paraffin content of from about 20 vol. % to about 35 vol. %, based on the total weight of the total paraffin content; and
(g) an iso-paraffin content of from about 22 vol. % to about 35 vol. %, based on the total weight of the total paraffin content.

7. The jet fuel composition of claim 1, comprising a smoke point above about 19 mm, as determined by ASTM D 1322.

8. The jet fuel composition of claim 1, comprising a freeze point below about −41° C., as determined by ASTM D 2386.

9. The jet fuel composition of claim 1, comprising:
(a) a total aromatics content of from 2 vol. % to no more than about 5 vol. %;
(b) a net heat of combustion of at least about 128,000 Btu/gal;
(c) a concentration of less than about 5 vol. % of hydrocarbons having a boiling point greater than or equal to about 550° F., as determined by ASTM D 2887;
(d) a JFTOT thermal stability characterized by a filter pressure drop of no more than 25 mm Hg, a breakpoint temperature greater than or equal to about 300° C., and an overall tube deposit rating less than 3, as determined by ASTM D 3241;
(e) a cycloparaffin content of from about 22 vol. % to about 35 vol. %, based on the total weight of the total paraffin content;
(f) a normal paraffin content of from about 20 vol. % to about 35 vol. %, based on the total weight of the total paraffin content; and
(g) an iso-paraffin content of from about 22 vol. % to about 35 vol. %, based on the total weight of the total paraffin content.

10. The jet fuel composition of claim 9, further comprising:
a smoke point above about 19 mm, as determined by ASTM D 1322; and
a freeze point below about −41° C., as determined by ASTM D 2386.

11. A method of making a jet fuel composition, which comprises:
(a) providing a hydrocarbonaceous feedstock comprising at least about 40 vol. % total aromatics, wherein the hydrocarbonaceous feedstock is selected from the group consisting of one or more producing wells in fluid communication with a subterranean oil reservoir and a highly aromatic refinery stream; and
(b) subjecting at least a portion of the hydrocarbonaceous feedstock to hydrogenation under catalytic hydrogenating conditions to form a jet fuel composition comprising:
(i) a total aromatics content of from 2 vol. % to no more than about 25 vol. %;
(ii) a net heat of combustion of at least about 128,000 Btu/gal;
(iii) a concentration of less than about 5 vol. % of hydrocarbons having a boiling point greater than or equal to about 550° F., as determined by ASTM D 2887;
(iv) a JFTOT thermal stability characterized by a filter pressure drop of no more than 25 mm Hg, a breakpoint temperature greater than or equal to about 300° C., and an overall tube deposit rating less than 3, as determined by ASTM D 3241;
(v) a cycloparaffin content of from about 22 vol. % to about 35 vol. %, based on the total weight of the total paraffin content;

(vi) a normal paraffin content of from about 20 vol. % to about 35 vol. %, based on the total weight of the total paraffin content; and (vii) an iso-paraffin content of from about 22 vol. % to about 35 vol. %, based on the total weight of the total paraffin content.

12. The method of claim 11, wherein the step of hydrogenating comprises contacting the hydrocarbonaceous feedstock with a hydrogenation catalyst in the presence of hydrogen-containing gas in a reaction zone and under effective catalytic hydrogenating conditions.

13. The method of claim 12, wherein the hydrogenation catalyst comprises one or more catalytic metals on the surface of a catalyst support.

14. The method of claim 13, wherein the one or more catalytic metals include metals, oxides and sulfides of metals selected from the group consisting of Group VI-B metals, Group VII metals, Group VIII metals and combinations thereof and the catalyst support includes an alumina catalyst support, silica-alumina catalyst support, silica catalyst support, titania catalyst support, or magnesia catalyst support.

15. The method of claim 11, wherein the catalytic hydrogenating conditions include a temperature ranging from about 316° C. to about 413° C., a pressure ranging from about 1000 to about 3500 pounds per square inch absolute (psia), a space velocity ranging from about 0.5 to about 3.0 liquid hourly space velocity (LHSV), and a gas flow ranging from about 3500 to about 10,000 Standard cubic feet per barrel (SCFB) of hydrogen of at least about 75% purity.

16. The method of claim 11, wherein the catalytic hydrogenating conditions include a temperature ranging from about 360° C. to about 399° C., a pressure ranging from about 1500 to about 2850 psia, a space velocity ranging from about 1.0 to about 2.0 LHSV, and a gas flow ranging from about 5000 to about 8000 SCFB of hydrogen of at least about 80% purity.

17. The method of claim 11, further comprising the step of subjecting the hydrogenated hydrocarbonaceous feedstock to distillation to separate from the hydrogenated hydrocarbonaceous feedstock any hydrocarbons, if present, having a boiling point greater than or equal to about 550° F.

18. The method of claim 11, wherein the jet fuel composition further comprises:
a smoke point above about 19 mm, as determined by ASTM D 1322; and a freeze point below about −41° C., as determined by ASTM D 2386.

19. A method of making a jet fuel composition, which comprises:
(a) providing a hydrocarbonaceous feedstock comprising:
(i) a total aromatics content of from 2 vol. % to no more than about 25 vol. %; and
(ii) a cycloparaffin content of at least about 60 vol. %, wherein the hydrocarbonaceous feedstock is selected from the group consisting of one or more producing wells in fluid communication with a subterranean oil reservoir and a highly aromatic refinery stream;
(b) blending a sufficient amount of iso-paraffins and normal paraffins to reduce the cycloparaffin content to about 22 to about 35 vol. %; and
(c) separating from the blended hydrocarbonaceous feedstock any hydrocarbons having a boiling point greater than or equal to about 550° F., as determined by ASTM D 2887, by distillation to form a jet fuel composition comprising:
(i) a total aromatics content of from 2 vol. % to no more than about 25 vol. %;
(ii) a net heat of combustion of at least about 128,000 Btu/gal;
(iii) a concentration of less than about 5 vol. % of hydrocarbons having a boiling point greater than or equal to about 550° F., as determined by ASTM D 2887;
(iv) a JFTOT thermal stability characterized by a filter pressure drop of no more than 25 mm Hg, a breakpoint temperature greater than or equal to about 300° C., and an overall tube deposit rating less than 3, as determined by ASTM D 3241;
(v) a cycloparaffin content of from about 22 to about 35 vol. %;
(vi) a normal paraffin content of from about 20 vol. % to about 35 vol. %, based on the total weight of the total paraffin content; and
(vii) an iso-paraffin content of from about 22 vol. % to about 35 vol. %, based on the total weight of the total paraffin content.

* * * * *